(12) United States Patent
Nishimori et al.

(10) Patent No.: US 11,715,993 B2
(45) Date of Patent: Aug. 1, 2023

(54) MOTOR-DRIVEN COMPRESSOR

(71) Applicant: KABUSHIKI KAISHA TOYOTA JIDOSHOKKI, Kariya (JP)

(72) Inventors: Noritaka Nishimori, Kariya (JP); Toshiyuki Kobayashi, Kariya (JP); Takayuki Kato, Kariya (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 312 days.

(21) Appl. No.: 17/213,558

(22) Filed: Mar. 26, 2021

(65) Prior Publication Data

US 2021/0305879 A1 Sep. 30, 2021

(30) Foreign Application Priority Data

Mar. 31, 2020 (JP) ................................ 2020-065204

(51) Int. Cl.
*H02K 5/24* (2006.01)
*G10K 11/168* (2006.01)
*H02K 11/33* (2016.01)
*F25B 31/02* (2006.01)
*B32B 15/085* (2006.01)
*B32B 15/082* (2006.01)
*B60H 1/32* (2006.01)

(52) U.S. Cl.
CPC .............. *H02K 5/24* (2013.01); *B32B 15/082* (2013.01); *B32B 15/085* (2013.01); *B60H 1/3222* (2013.01); *F25B 31/026* (2013.01); *G10K 11/168* (2013.01); *H02K 11/33* (2016.01); *B32B 2307/102* (2013.01)

(58) Field of Classification Search
CPC .. H02K 5/24; G10K 11/168; B32B 2307/102; F25B 2500/12
USPC ............................................ 181/205; 310/51
See application file for complete search history.

(56) References Cited

U.S. PATENT DOCUMENTS 9,068,458 B2 * 6/2015 Ota ..................... F04C 29/0021
2012/0251356 A1 10/2012 Ota et al.
2014/0003973 A1 * 1/2014 Arai ...................... F04B 39/121
903/902

(Continued)

FOREIGN PATENT DOCUMENTS

CN 208221024 U 12/2018
CN 111262384 A * 6/2020
DE 39 09 563 A1 9/1990

(Continued)

*Primary Examiner* — Jeremy A Luks
(74) *Attorney, Agent, or Firm* — Sughrue Mion, PLLC

(57) ABSTRACT

A motor-driven compressor includes a compression unit, an electric motor, a drive circuit, a first housing, a second housing, and a soundproofing material. The second housing covers at least part of an outer surface of the first housing. The soundproofing material is arranged between the outer surface of the first housing and an area that includes an inner surface and a wall surface of the second housing. The soundproofing material has sound insulating properties. The soundproofing material includes a sound absorbing layer and a sound insulating layer. A first region and a second region are formed between the outer surface of the first housing and the area that includes the inner surface and the wall surface of the second housing. An air layer is formed in the second region.

6 Claims, 3 Drawing Sheets

(56) References Cited

U.S. PATENT DOCUMENTS

2019/0248222 A1* 8/2019 Honjo ...................... B60K 1/00

FOREIGN PATENT DOCUMENTS

| JP | 2000-124623 | A |   | 4/2000 |
|----|-------------|---|---|--------|
| JP | 2012-211533 | A |   | 11/2012 |
| JP | 2013088002  | A | * | 5/2013 |
| JP | 2013-194673 | A |   | 9/2013 |
| JP | 2020-007975 | A |   | 1/2020 |
| KR | 100487337   | B1 | * | 5/2005 |

* cited by examiner

Rearward of Vehicle ⟷ Forward of Vehicle

MOTOR-DRIVEN COMPRESSOR

BACKGROUND

1. Field

The present disclosure relates to a motor-driven compressor.

2. Description of Related Art

Japanese Laid-Open Patent Publication No. 2012-211533 discloses a motor-driven compressor. The motor-driven compressor includes a compression unit, which compresses fluid, an electric motor, which drives the compression unit, and a drive circuit, which drives the electric motor. The motor-driven compressor includes a first housing, which accommodates the compression unit, the electric motor, and the drive circuit, and a second housing, which covers the external surface of the first housing. The motor-driven compressor includes a soundproofing material, which has sound insulating properties. The soundproofing material is arranged between the external surface of the first housing and a wall surface of the second housing that is opposed to the external surface of the first housing. When the compression unit and the electric motor operate, the first housing vibrates and generates noise. The generated noise is absorbed by the soundproofing material. This suppresses noise of the motor-driven compressor.

To improve the soundproofing performance, the motor-driven compressor disclosed in Japanese Laid-Open Patent Publication No. 2013-194673 has a two-layer structure of soundproofing material. The soundproofing material is formed by a sound absorbing layer and a sound insulating layer. The sound absorbing layer covers the external surface of the first housing. The sound insulating layer is stacked on the sound absorbing layer.

When the sound insulating layer is arranged between the wall surface of the second housing and the external surface of the first housing, the sound insulating layer may contact the second housing, generating noise.

SUMMARY

It is an objective of the present disclosure to provide a motor-driven compressor that suppresses contact noise of the soundproofing material, while improving the soundproofing performance.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a motor-driven compressor includes a compression unit that compresses a fluid, an electric motor that drives the compression unit, a drive circuit for driving the electric motor, a first housing that accommodates the compression unit, the electric motor, and the drive circuit, a second housing that covers at least part of an external surface of the first housing, and a soundproofing material that has sound insulating properties and is arranged between the external surface of the first housing and a wall surface of the second housing that is opposed to the external surface of the first housing. The soundproofing material includes a sound absorbing layer and a sound insulating layer. The sound absorbing layer contacts the external surface of the first housing. The sound absorbing layer has a hardness that is lower than a hardness of the first housing and a hardness of the second housing. The sound insulating layer is stacked on the sound absorbing layer. The sound insulating layer has a hardness that is lower than the hardness of the first housing and the hardness of the second housing and higher than the hardness of the sound absorbing layer. A first region and a second region are formed between the external surface of the first housing and the wall surface of the second housing. In the first region, the sound absorbing layer is in contact with the wall surface of the second housing without the sound insulating layer in between. In the second region, an air layer is formed to prevent the sound insulating layer stacked on the sound absorbing layer from contacting the wall surface of the second housing.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

A motor-driven compressor 1 according to an embodiment will now be described with reference to FIGS. 1 to 3. In the following description, the advancing direction of a vehicle 100, which is equipped with the motor-driven compressor 1, is defined as forward, and the reverse direction of the vehicle 100 is defined as rearward. The width direction of the vehicle 100 is defined as a left-right direction. As shown in FIG. 2, the left-right direction is orthogonal to the front-rear direction.

Figure 1:
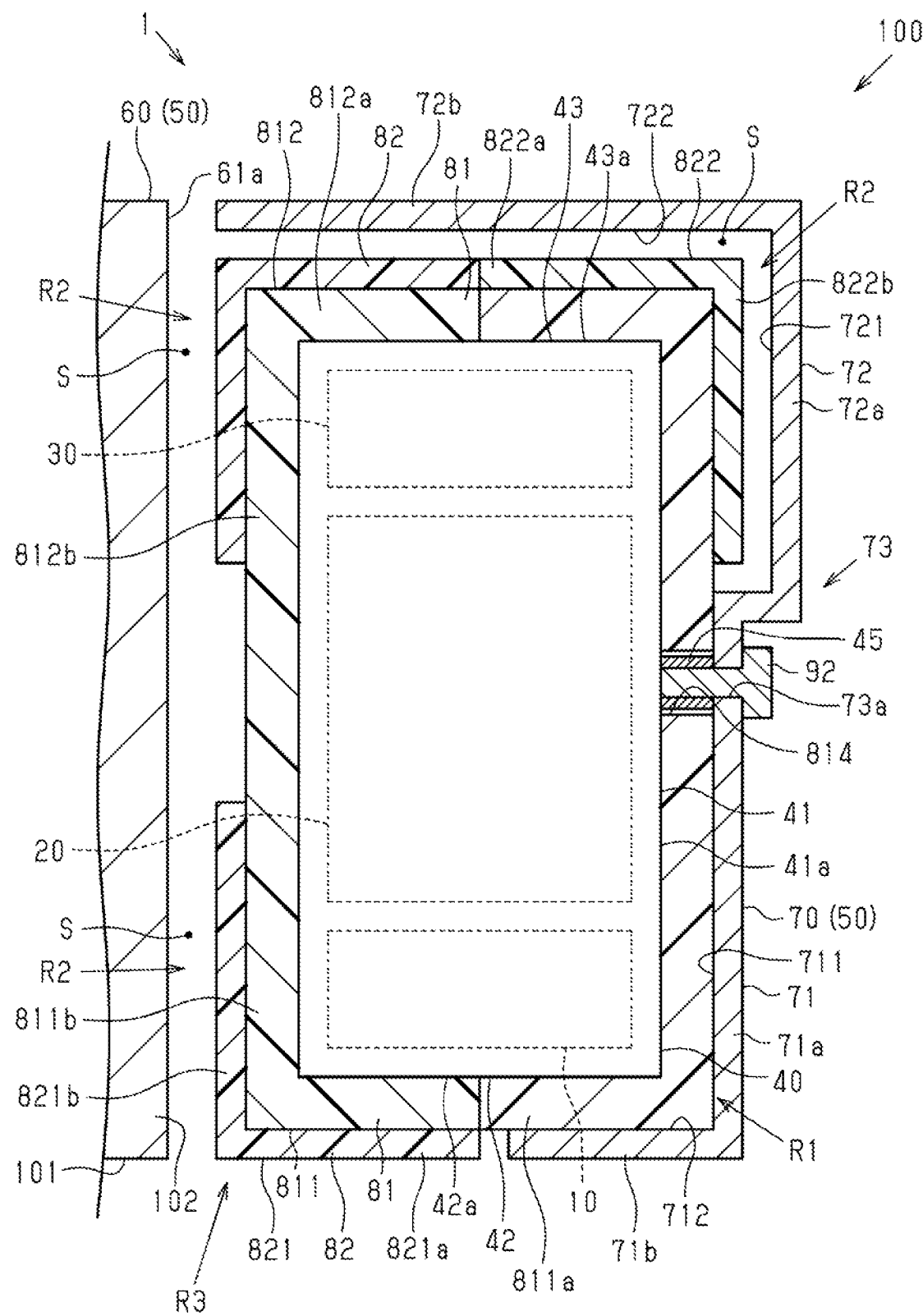
FIG. 1 is a schematic cross-sectional view of a motor-driven compressor.
Figure 2:
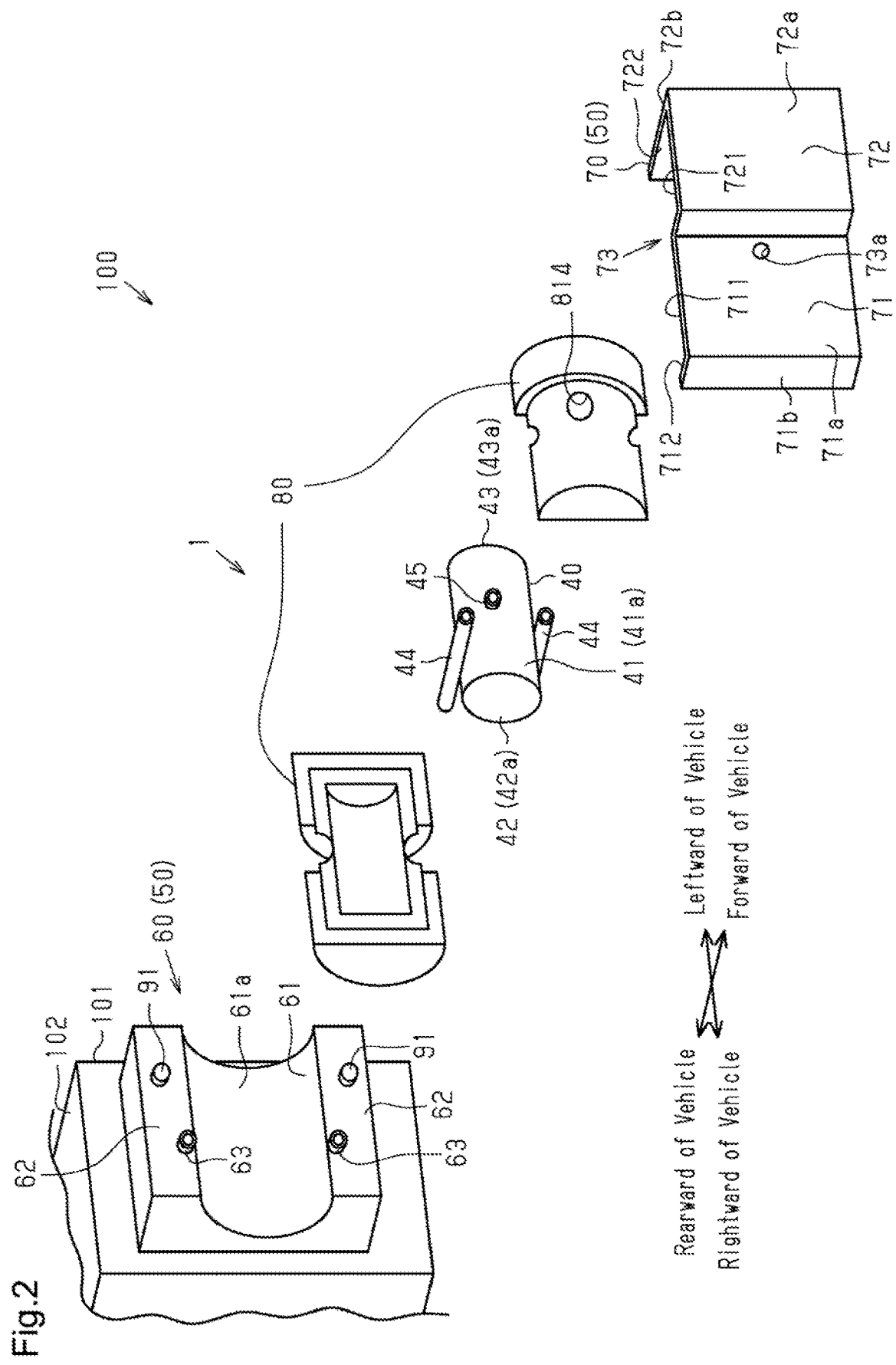
FIG. 2 is an exploded perspective view of the motor-driven compressor.

As shown in FIG. 1, the motor-driven compressor 1 is mounted on the vehicle 100 and is used for a vehicle air conditioner. The motor-driven compressor 1 includes a compression unit 10, which compresses fluid, an electric motor 20, which drives the compression unit 10, and a drive circuit 30, which drives the electric motor 20. The motor-driven compressor 1 includes an elongated tube-shaped first housing 40, which accommodates the compression unit 10, the electric motor 20, and the drive circuit 30 in a sealed state.

The compression unit 10, the electric motor 20, and the drive circuit 30 are known in the art and will thus be described schematically below.

The compression unit 10 is of, for example, a scroll type that includes a fixed scroll fixed to the inner circumferential surface of the first housing 40 and a movable scroll arranged to be opposed to the fixed scroll. The electric motor 20 includes a stator fixed to the inner circumferential surface of the first housing 40, a coil wound about the stator, a rotor arranged in the stator, and a rotary shaft that rotates integrally with the rotor. The drive circuit 30 is a known inverter circuit. The drive circuit 30 converts direct-current power supplied from a power source mounted on the vehicle 100 into alternate-current power, and supplies the alternate-current power to the coil, thereby driving the electric motor 20.

The first housing 40 is made of metal such as aluminum. The first housing 40 includes an elongated tube-shaped peripheral wall 41, a first wall 42, and a second wall 43. The peripheral wall 41 extends in the longitudinal direction of the first housing 40. The first wall 42 and the second wall 43 are located at the ends in the longitudinal direction of the first housing 40. The first wall 42 and the second wall 43 are respectively continuous with the opposite ends of the peripheral wall 41. The first housing 40 includes an internal space defined by the peripheral wall 41, the first wall 42, and the second wall 43. The first housing 40 accommodates in the internal space the compression unit 10, the electric motor 20, the drive circuit 30, which are arranged in that order in the longitudinal direction of the first housing 40. The first wall 42 is arranged in the vicinity of the compression unit 10. The second wall 43 is arranged in the vicinity of the drive circuit 30. The first housing 40 has a suction port and a discharge port (neither is shown). Refrigerant, which is fluid, is drawn into the suction port of the first housing 40 and compressed by the compression unit 10, and is then discharged from the discharge port of the first housing 40.

As shown in FIGS. 1 and 2, the external surface of the first housing 40 includes an outer surface 41a of the peripheral wall 41, an outer surface 42a of the first wall 42, and an outer surface 43a of the second wall 43. As shown in FIGS. 2 and 3, the first housing 40 includes two tubular mount legs 44. Bolts 93 for fixing the motor-driven compressor 1 to a vehicle body 101 are passed through the mount legs 44. The positions of the mount legs 44 are symmetrical in the radial direction of the first housing 40. The mount legs 44 extend in the same direction, which is orthogonal to the axial direction of the first housing 40.

As shown in FIGS. 1 and 2, the peripheral wall 41 of the first housing 40 includes a tubular receiving portion 45. The receiving portion 45 has an internal thread on the inner circumferential surface. The receiving portion 45 extends from the outer surface 41a of the peripheral wall 41 in the same direction as the mount legs 44.

The motor-driven compressor 1 includes a second housing 50, which partially covers the external surface of the first housing 40. The second housing 50 includes a metal bracket 60, which fixes the first housing 40 to the vehicle body 101, and a metal protector 70, which protects the first housing 40 from impacts from the outside of the vehicle 100. The vehicle body 101 includes a vehicle attachment portion 102, which is located inside the vehicle 100. The motor-driven compressor 1 is located forward of the vehicle attachment portion 102. The first housing 40 extends in the left-right direction. The two mount legs 44 extend in the front-rear direction, and the receiving portion 45 extends forward.

As shown in FIG. 2, the bracket 60 is block-shaped. The bracket 60 includes a groove 61, which extends in the longitudinal direction of the first housing 40. The groove 61 extends in the left-right direction so as to connect the opposite ends of the bracket 60 to each other. The groove 61 has an arcuate inner surface 61a. The bracket 60 includes two attachment portions 62. The attachment portions 62 are respectively formed on the opposite sides of the groove 61. The two attachment portions 62 of the bracket 60 are fastened to the vehicle attachment portion 102 with bolts 91. As shown in FIG. 1, the inner surface 61a of the bracket 60 is opposed to the outer surface 41a of the peripheral wall 41 and is separated from the outer surface 41a of the peripheral wall 41.

As shown in FIG. 2, each of the attachment portions 62 includes a tubular fastening base 63 extending toward the first housing 40. Each fastening base 63 has an internal thread on the inner circumferential surface.

Figure 3:
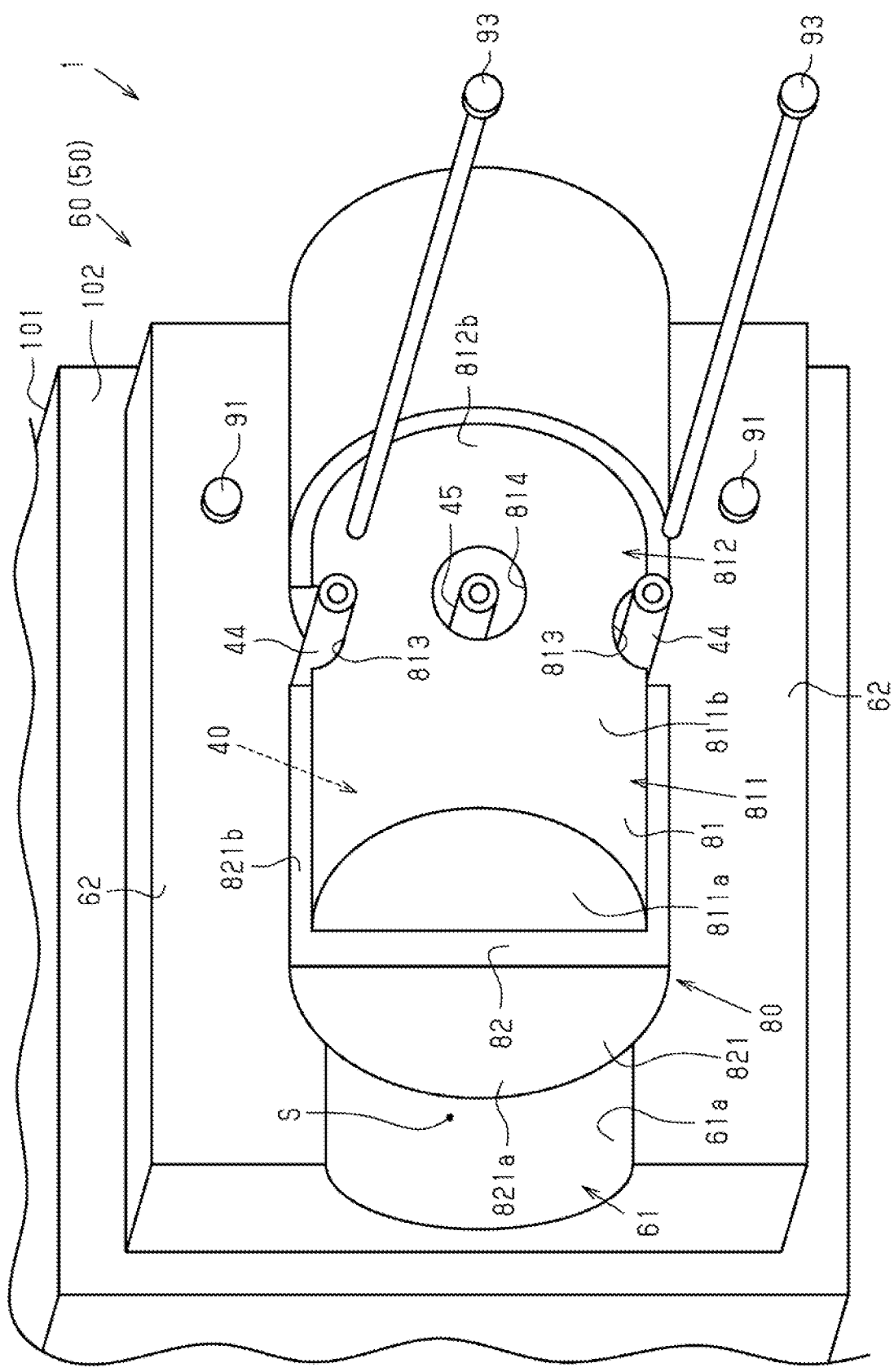
FIG. 3 is a perspective view of the motor-driven compressor.

As shown in FIGS. 2 and 3, the bolts 93 are passed through the two mount legs 44 of the first housing 40. The bolts 93 are threaded into the internal threads on the inner circumferential surface of the fastening bases 63. The first housing 40 is thus fixed to the bracket 60 with the bolts 93, so that the motor-driven compressor 1 is fixed to the vehicle body 101. That is, the bracket 60 includes the fastening bases 63, which serve as fastening portions fastened to the first housing 40 with the bolts 93.

As shown in FIGS. 1 and 2, the protector 70 is arranged such that the first housing 40 is located between the protector 70 and the bracket 60. The protector 70 is located forward of the motor-driven compressor 1.

As shown in FIG. 1, the protector 70 includes an attachment plate 73, a first protecting portion 71, and a second protecting portion 72. The attachment plate 73 contacts the receiving portion 45 of the first housing 40 and has a through-hole 73a. The first protecting portion 71 and the second protecting portion 72 are formed integrally with the attachment plate 73. The attachment plate 73 is attached to the receiving portion 45 with a bolt 92, which is a fastening member. The bolt 92 is passed through the through-hole 73a and is threaded into the internal thread on the inner circumferential surface of the receiving portion 45. A portion of the attachment plate 73 that contacts the receiving portion 45 of the first housing 40 is an example of a fastening portion.

The first protecting portion 71 includes a first protecting wall 71a and a first extension wall 71b. The first protecting wall 71a extends from the attachment plate 73 toward the first wall 42 along the outer surface 41a of the peripheral wall 41. The first extension wall 71b extends from an end of the first protecting wall 71a that is on the side opposite to the attachment plate 73, to a position opposed to the first wall 42. The first protecting wall 71a and the first extension wall 71b are both plate-shaped. The first protecting wall 71a has a wall surface 711 that is opposed to and separated from the outer surface 41a of the peripheral wall 41. The first protecting wall 71a does not cover a portion of the outer surface 41a of the peripheral wall 41 that is opposed to the vehicle attachment portion 102.

As shown in FIGS. 1 and 2, the first protecting wall 71a covers a predetermined range in the front part of the outer surface 41a of the peripheral wall 41. The predetermined range in the front part of the outer surface 41a of the peripheral wall 41 refers to a range in the circumferential direction of the outer surface 41a of the peripheral wall 41. The first protecting wall 71a covers a portion of the outer surface 41a of the peripheral wall 41 that is located between the attachment plate 73 and the first wall 42. The first extension wall 71b has a wall surface 712 that is opposed to and separated from the outer surface 42a of the first wall 42. The first extension wall 71b is opposed to part of the outer surface 42a of the first wall 42. The first extension wall 71b covers a front part of the outer surface 42a of the first wall 42.

As shown in FIG. 1, the second protecting portion 72 includes a second protecting wall 72a and a second extension wall 72b. The second protecting wall 72a extends from the attachment plate 73 toward the second wall 43 along the outer surface 41a of the peripheral wall 41. The second extension wall 72b extends from an end of the second protecting wall 72a that is on a side opposite to the attachment plate 73 to a position opposed to the second wall 43. The second protecting wall 72a and the second extension wall 72b are both plate-shaped. The second protecting wall 72a has a wall surface 721 that is opposed to and separated from the outer surface 41a of the peripheral wall 41. The second protecting wall 72a does not cover the portion of the outer surface 41a of the peripheral wall 41 that is opposed to the vehicle attachment portion 102.

As shown in FIGS. 1 and 2, the second protecting wall 72a covers a predetermined range in the front part of the outer surface 41a of the peripheral wall 41. The second protecting wall 72a covers a portion of the outer surface 41a of the peripheral wall 41 that is located between the attachment plate 73 and the second wall 43. The second extension wall 72b has a wall surface 722 that is opposed to and separated from the outer surface 43a of the second wall 43. The second extension wall 72b is opposed to the outer surface 43a of the second wall 43. The second extension wall 72b covers the entire outer surface 43a of the second wall 43.

The motor-driven compressor 1 includes a soundproofing material 80. The soundproofing material 80 includes two cover members. The first housing 40 is covered by the two cover members. The structure of the soundproofing material 80 will now be described. Specifically, the structure of the soundproofing material 80 with the two cover members covering the first housing 40 will be described.

As shown in FIGS. 1 and 3, the soundproofing material 80 includes a sound absorbing layer 81 and a sound insulating layer 82. The sound absorbing layer 81 is made of a soft material having sound absorbency. An open-cell plastic foam, such as urethane foam, is used as the sound absorbing layer 81. The sound absorbing layer 81 has a hardness that is lower than those of the first housing 40 and the second housing 50. The sound insulating layer 82 is made of a soft material having sound insulating properties. The sound insulating layer 82 is a sound insulating sheet made of, for example, vinyl chloride plastic or polyolefin plastic. The sound insulating layer 82 has a hardness that is lower than those of the first housing 40 and the second housing 50 and higher than that of the sound absorbing layer 81.

As shown in FIG. 1, the sound absorbing layer 81 includes a first sound absorbing portion 811 and a second sound absorbing portion 812. The first sound absorbing portion 811 includes a plate-shaped bottom wall 811a and a tubular peripheral wall 811b, which extends from the outer edge of the bottom wall 811a. The bottom wall 811a is in contact with the outer surface 42a of the first wall 42. The bottom wall 811a covers the entire outer surface 42a of the first wall 42. The bottom wall 811a is in contact with the wall surface 712 of the first extension wall 71b. A front part of the outer surface of the bottom wall 811a is covered with the wall surface 712 of the first extension wall 71b.

The second sound absorbing portion 812 includes a plate-shaped bottom wall 812a and a tubular peripheral wall 812b, which extends from the outer edge of the bottom wall 812a. The bottom wall 812a is in contact with the outer surface 43a of the second wall 43. The bottom wall 812a covers the entire outer surface 43a of the second wall 43. The bottom wall 812a is separated from the wall surface 722 of the second extension wall 72b. The peripheral wall 812b is separated from the wall surface 721 of the second protecting wall 72a.

As shown in FIGS. 1 and 3, the peripheral wall 811b of the first sound absorbing portion 811 and the peripheral wall 812b of the second sound absorbing portion 812 are continuous with each other in the longitudinal direction of the first housing 40. The first sound absorbing layer 81 includes two avoidance portions 813 and a through-hole 814, which are located at the boundary between the first sound absorbing portion 811 and the second sound absorbing portion 812. The avoidance portions 813 are formed to avoid the two mount legs 44 of the first housing 40. The through-hole 814 extends through the sound absorbing layer 81 in the thickness direction. The receiving portion 45 of the first housing 40 is inserted into the through-hole 814. The sound absorbing layer 81 has the shape of an elongate tube, and contacts and covers the external surface of the first housing 40, which includes the outer surfaces 41a, 42a, 43a. The first sound absorbing portion 811 of the sound absorbing layer 81 is a portion between the bottom wall 811a and the section including the avoidance portions 813 and the through-hole 814. The second sound absorbing portion 812 of the sound absorbing layer 81 is a portion between the bottom wall 812a and the section including the avoidance portions 813 and the through-hole 814.

As shown in FIG. 1, the sound insulating layer 82 includes a first sound insulating portion 821 and a second sound insulating portion 822. The first sound insulating portion 821 includes a first wall 821a, which is stacked on the bottom wall 811a of the first sound absorbing portion 811, and a second wall 821b, which is stacked on the peripheral wall 811b. The first wall 821a and the second wall 821b are both plate-shaped. The first wall 821a is arranged to cover a rear part of the outer surface 42a of the first wall 42. The first wall 821a is arranged to cover a rear part of the of the outer surface of the bottom wall 811a. The front end of the first wall 821a is not in contact with the rear end of the first extension wall 71b.

The second wall 821b extends from the rear end of the first wall 821a along the peripheral wall 811b of the first sound absorbing portion 811.

As shown in FIGS. 1 and 3, the second wall 821b has an arcuate shape so as to cover a predetermined range in a rear part of the outer surface of the peripheral wall 811b. The predetermined range in the rear part of the outer surface of the peripheral wall 811b refers to a range in the circumferential direction of the outer surface of the peripheral wall 811b. The predetermined range in the rear part of the outer surface of the peripheral wall 811b is set so as to prevent the second wall 821b from contacting the first protecting portion 71 of the protector 70. The second wall 821b is arranged so as not to contact the two mount legs 44. The second wall 821b is not in contact with the inner surface 61a of the groove 61 of the bracket 60.

As shown in FIG. 1, the second sound insulating portion 822 includes a plate-shaped bottom wall 822a and a tubular peripheral wall 822b, which extends from the outer edge of the bottom wall 822a. The bottom wall 822a covers the entire outer surface of the bottom wall 812a. The bottom wall 822a is separated from the wall surface 722 of the second extension wall 72b. The peripheral wall 822b extends along the peripheral wall 812b. The peripheral wall 822b is stacked on the peripheral wall 812b. The peripheral wall 822b is arranged so as not to contact the two mount legs 44. The peripheral wall 822b is not in contact with the wall surface 721 of the second protecting wall 72a. The peripheral wall 822b is not in contact with the inner surface 61a of the groove 61 of the bracket 60. The sound insulating layer 82 is stacked on the sound absorbing layer 81. The first sound insulating portion 821 and the second sound insulating portion 822 are not continuous in the longitudinal direction of the first housing 40.

The above-described motor-driven compressor 1 includes the soundproofing material 80, which has sound insulating properties and is located between the outer surfaces 41a, 42a, 43a, which are parts of the external surface of the first housing 40, and an area that includes the inner surface 61a of the second housing 50 and the wall surfaces 711, 712, 721, 722.

The soundproofing material 80 is not arranged between the first housing 40 and the fastening bases 63, and not in between the first housing 40 and the portion of the attachment plate 73 that is in contact with the receiving portion 45. A first region R1 is formed between the outer surfaces 41a, 42a, 43a of the first housing 40 and an area that includes the inner surface 61a of the second housing 50 and the wall surfaces 711, 712, 721, 722. In the first region R1, the sound absorbing layer 81 is in contact with the wall surfaces 711, 712 of the second housing 50 without the sound insulating layer 82 in between. The first region R1 is a region in the motor-driven compressor 1 that accommodates the compression unit 10. The first region R1 is also referred to as a region in which the sound absorbing layer 81 is stacked on the outer surface 41a of the first housing 40, and a region on which the second housing 50 is stacked without the sound insulating layer 82 in between. An air layer S is formed between the inner surface 61a of the bracket 60 and the outer surface 41a of the first housing 40, so as to prevent the sound insulating layer 82 from contacting the bracket 60. That is, the sound insulating layer 82 and the bracket 60 are separated from each other. The air layer S is formed between the wall surfaces 721, 722 of the protector 70 and the outer surfaces 41a, 43a of the first housing 40, so as to prevent the sound insulating layer 82 from contacting the protector 70. The sound insulating layer 82 and the protector 70 are thus separated from each other. That is, a second region R2 is formed between the outer surfaces 41a, 42a, 43a of the first housing 40 and an area including the inner surface 61a of the second housing 50 and the wall surfaces 711, 712 721, 722. The second region R2 includes the air layer S, so as to prevent the sound insulating layer 82 stacked on the sound absorbing layer 81 from contacting the inner surface 61a or the wall surfaces 721, 722 of the second housing 50. The second region R2 is formed by regions on the motor-driven compressor 1 that include a region accommodating the drive circuit 30 and the region accommodating the compression unit 10. The second region R2 is also referred to as a region in which the sound absorbing layer 81, the sound insulating layer 82, the air layer S, and the second housing 50 are stacked on the outer surface 41a of the first housing 40. Also, the second region R2 is provided in a region on a side opposite to the vehicle body 101. That is, the second region R2 is arranged to face the outside of the vehicle 100 with respect to the motor-driven compressor 1. The second region R2 is thus suitable to suppress leakage of noise of the motor-driven compressor 1 to the outside of the vehicle body 101.

The external surface of the first housing 40 includes a third region R3 in a portion that is not covered with the second housing 50. That is, the third region R3 is a section other than the first region R1 and the second region R2. The sound absorbing layer 81 and the sound insulating layer 82 are stacked together in the third region R3. The shapes of the bracket 60 and the protector 70 are determined such that the motor-driven compressor 1 can be mounted on the vehicle 100. Such shapes of the bracket 60 and the protector 70 result in a section of the external surface of the first housing 40 not being covered. The third region R3 improves the soundproofing performance of this section.

An operation of the present embodiment will now be described.

As in the case of the related art, the sound absorbing layer 81 is in contact with the wall surfaces 711, 712 of the second housing 50 in the first region R1. Thus, when the compression unit 10 and the electric motor 20 operate, so that the first housing 40 vibrates and generates noise, the generated noise is absorbed by the sound absorbing layer 81. Noise that attempts to pass through the sound absorbing layer 81 is reflected by the first protecting portion 71 and is returned to the sound absorbing layer 81. This improves the sound absorbing performance of the sound absorbing layer 81. When the first housing 40 vibrates, noise is generated in the second region R2. The noise is absorbed by the sound absorbing layer 81. Noise that attempts to pass through the sound absorbing layer 81 is reflected by the sound insulating layer 82 and is returned to the sound absorbing layer 81. This improves the sound absorbing performance of the sound absorbing layer 81. In the second region R2, the noise that attempts to pass through the sound insulating layer 82 is transmitted to the air layer S and is then transmitted to the second housing 50 from the air layer S. However, since vibration is not directly transmitted from the sound insulating layer 82 to the second housing 50, the vibration of the second housing 50 is suppressed. That is, in the second region R2, the noise generated by vibration of the first housing 40 is progressively attenuated as it is transmitted through the sound absorbing layer 81, the sound insulating layer 82, the air layer S, and the second housing 50 in that order. Also, the air layer S is formed between the sound insulating layer 82 and the area that includes the inner surface 61a of the second housing 50 and the wall surfaces 721, 722. Thus, the sound insulating layer 82 is unlikely to contact the inner surface 61a of the second housing 50 and the wall surfaces 721, 722.

The present embodiment has the following advantages.

(1) When the first housing 40 vibrates, noise is generated in the first region R1 and the second region R2. The noise is absorbed by the sound absorbing layer 81. In the first region R1, noise that attempts to pass through the sound absorbing layer 81 is reflected by the first protecting portion 71 and is returned to the sound absorbing layer 81. This improves the sound absorbing performance of the sound absorbing layer 81. In the second region R2, noise that attempts to pass through the sound absorbing layer 81 is reflected by the sound insulating layer 82 and returned to the sound absorbing layer 81. This improves the sound absorbing performance of the sound absorbing layer 81. Also, in the second region R2, the noise generated by vibration of the first housing 40 is progressively attenuated as it is transmitted through the sound absorbing layer 81, the sound insulating layer 82, the air layer S, and the second housing 50 in that order. The improves the soundproofing performance. Also, the air layer S makes it hard for the sound insulating layer 82 to contact the inner surface 61a of the second housing 50 and the wall surfaces 721, 722. Therefore, contact noise is unlikely to be generated. It is thus possible to suppress contact noise of the soundproofing material 80 while improving the soundproofing performance.

(2) In some cases, the soundproofing material 80 is arranged, for example, between the fastening portion of the second housing 50 and the first housing 40. In this state, if the fastening portion of the second housing 50 is fastened to the first housing 40 with a fastening member, the soundproofing material 80 may be compressed. Thereafter, when the fastening force with which the second housing 50 is fastened to the first housing 40 is weakened, the soundproofing material 80, which has been compressed, may fail to achieve the soundproofing performance determined during the design of the motor-driven compressor 1. In this regard, the present embodiment does not place the soundproofing material 80 between the first housing 40 and the fastening bases 63, and not in between the first housing 40 and a portion of the attachment plate 73 that is in contact with the receiving portion 45. This stabilizes the fastening force between the fastening bases 63 and the first housing 40 and the fastening force between the first housing 40 and a portion of the attachment plate 73 that is in contact with the receiving portion 45, and also improves the soundproofing performance of the soundproofing material 80.

(3) In a case in which the motor-driven compressor 1 is mounted on the vehicle 100, a protector is employed to protect the motor-driven compressor 1 from impacts from the outside of the vehicle 100 in some cases. If a protector is employed, noise may be generated by the protector contacting the sound insulating layer 82 of the soundproofing material 80, in addition to the noise generated by vibration of the first housing 40. In this regard, the present embodiment is provided with the second region R2 formed between the wall surfaces 721, 722 of the protector 70 and the outer surfaces 41a, 43a of the first housing 40. The protector 70 is thus unlikely to contact the sound insulating layer 82 of the soundproofing material 80. It is thus possible to improve the soundproofing performance and suppress contact noise of the soundproofing material 80, while protecting the motor-driven compressor 1 with the protector 70.

(4) The third region R3 is formed to further improve the soundproofing performance of the motor-driven compressor 1.

(5) The protector 70 is located forward of the motor-driven compressor 1. A four-layer structure including the peripheral wall 812b of the second sound absorbing portion 812, the peripheral wall 822b of the second sound insulating portion 822, the air layer S, and the second protecting wall 72a of the protector 70, is arranged forward of the motor-driven compressor 1. This suppresses forward transmission of the noise of the motor-driven compressor 1. Also, a four-layer structure including the bottom wall 812a of the second sound absorbing portion 812, the bottom wall 822a of the second sound insulating portion 822, the air layer S, and the second extension wall 72b of the protector 70, is arranged beside the motor-driven compressor 1 in the lateral direction of the vehicle 100. This suppresses lateral transmission of the noise of the motor-driven compressor 1 in the vehicle 100. This suppresses transmission of the noise of the motor-driven compressor 1 to the outside of the vehicle 100.

The present embodiment may be modified as follows. The present embodiment and the following modifications can be combined as long as the combined modifications remain technically consistent with each other.

The motor-driven compressor 1 may be employed in any suitable application to compress any type of fluid. For example, if the vehicle 100 is a fuel cell vehicle, the motor-driven compressor 1 may be employed in the air supplying device that supplies air to the fuel cell. That is, the fluid to be compressed is not limited to refrigerant, but may be any fluid such as air.

The bracket 60 of the second housing 50 is employed to attach the motor-driven compressor 1 to the vehicle body 101. However, the present disclosure is not limited to this. For example, the bracket 60 may be a bracket that is used to attach another component such as a pipe or a sensor of the motor-driven compressor 1 to the first housing 40.

The bracket 60 includes the groove 61. However, the present disclosure is not limited to this. The structure of the bracket 60 may be changed as long as the bracket 60 can be used to fasten the first housing 40, and thus the motor-driven compressor 1, to the vehicle body 101. In such a modification, an air layer S may be formed between the front surface of the bracket 60 and the sound insulating layer 82. That is, an air layer S may be formed between the sound insulating layer 82 and a wall surface of the bracket 60 that is opposed to the outer surface 41a of the peripheral wall 41.

The second housing 50 includes the bracket 60 and the protector 70. However, the bracket 60 may be omitted, and the motor-driven compressor 1 may be attached to the vehicle body 101.

The first region R1 is formed in a region of the motor-driven compressor 1 that accommodates the compression unit 10. However, the present disclosure is not limited to this. For example, the first region R1 may be formed in a region that accommodates the drive circuit 30 or a region that accommodates the electric motor 20.

The second region R2 is formed in a region of the motor-driven compressor 1 that accommodates the drive circuit 30. However, the present disclosure is not limited to this. For example, the second region R2 may be formed in a region that accommodates the compression unit 10 or a region that accommodates the electric motor 20.

The first region R1 may be formed by causing the wall surfaces 721, 722 of the protector 70 and the external surface of the peripheral wall 812b of the second sound absorbing portion 812 to contact each other. In this modification the second region R2 is formed only between the inner surface 61a of the bracket 60 and the outer surface 41a of the first housing 40.

The second housing 50 includes the bracket 60 and the protector 70. However, the second housing 50 may include a box-shaped member that accommodates the first housing 40. That is, the second housing 50 may be configured to cover all the outer surfaces 41a, 42a, 43a, which are the external surfaces of the first housing 40.

The soundproofing material 80 may be arranged between the first housing 40 and the fastening bases 63 and between the first housing 40 and the portion of the attachment plate 73 that is in contact with the receiving portion 45. In this modification, the fastening force of the bolts 92, 93 may be changed to an extent that ensures the soundproofing performance determined during the design of the motor-driven compressor 1.

The positions and the numbers of the mount legs 44 and the fastening bases 63 may be changed.

The motor-driven compressor 1 is located forward of the vehicle attachment portion 102. However, the present disclosure is not limited to this. The motor-driven compressor 1 may be located beside the vehicle attachment portion 102, that is, on the right or left side of the vehicle attachment portion 102.

The arrangement of the compression unit 10, the electric motor 20, and the drive circuit 30 in the first housing 40 may be changed.

The compression unit 10 does not necessarily need to be of a scroll type. The structure of the compression unit 10 may be changed as long as it can compress fluid.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A motor-driven compressor, comprising:
    a compression unit that compresses a fluid;
    an electric motor that drives the compression unit;
    a drive circuit for driving the electric motor;
    a first housing that accommodates the compression unit, the electric motor, and the drive circuit;
    a second housing that covers at least part of an external surface of the first housing; and
    a soundproofing material that has sound insulating properties and is arranged between the external surface of the first housing and a wall surface of the second housing that is opposed to the external surface of the first housing, wherein
    the soundproofing material includes
        a sound absorbing layer that contacts the external surface of the first housing, the sound absorbing layer having a hardness that is lower than a hardness of the first housing and a hardness of the second housing, and
        a sound insulating layer that is stacked on the sound absorbing layer, the sound insulating layer having a hardness that is lower than the hardness of the first housing and the hardness of the second housing and higher than the hardness of the sound absorbing layer,
    a first region and a second region are formed between the external surface of the first housing and the wall surface of the second housing,
    in the first region, the sound absorbing layer is in contact with the wall surface of the second housing without the sound insulating layer in between, and
    in the second region, an air layer is formed to prevent the sound insulating layer stacked on the sound absorbing layer from contacting the wall surface of the second housing.

2. The motor-driven compressor according to claim 1, wherein
    the second housing includes a fastening portion that is fastened to the first housing with a fastening member, and
    the soundproofing material is not arranged between the fastening portion and the first housing.

3. The motor-driven compressor according to claim 2, wherein
    the motor-driven compressor is mounted on a vehicle,
    the second housing includes a metal protector,
    the protector includes the fastening portion that is attached to the first housing and protects the first housing from an impact from an outside of the vehicle, and
    at least the second region is formed between the wall surface of the protector and the external surface of the first housing.

4. The motor-driven compressor according to claim 3, wherein
    a third region is formed on a portion of the external surface of the first housing that is not covered with the second housing,
    in the third region, the sound absorbing layer and the sound insulating layer are stacked together.

5. The motor-driven compressor according to claim 3, wherein
    an advancing direction of the vehicle is defined as forward,
    a reverse direction of the vehicle is defined as rearward, and
    the protector is located forward of the motor-driven compressor.

6. The motor-driven compressor according to claim 5, wherein a four-layer structure is arranged forward of the motor-driven compressor, the four-layer structure including the air layer and walls of the sound absorbing layer, the sound insulating layer, and the protector.

* * * * *